United States Patent
Ng et al.

(10) Patent No.: US 6,373,835 B1
(45) Date of Patent: *Apr. 16, 2002

(54) METHOD AND APPARATUS FOR MAKING A PHONE CALL CONNECTION OVER AN INTERNET CONNECTION

(76) Inventors: Ede Phang Ng, Block 3, Toh Yi Drive #10-177, Singapore 590003 (SG); Eng Choon Loh, Block 363, Hougang Avenue 5, #10-280, Singapore 530363 (SG)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/910,887

(22) Filed: Aug. 13, 1997

(51) Int. Cl.[7] ............................................. H04L 12/66
(52) U.S. Cl. ...................................... 370/352; 370/356
(58) Field of Search ................................ 370/352, 353, 370/380, 389, 392, 396, 401, 404, 427, 435, 450, 465, 354–359; 379/90.01, 93.05, 93.09, 100.15, 100.16

(56) References Cited

U.S. PATENT DOCUMENTS

| | | | | |
|---|---|---|---|---|
| 5,303,301 A | * | 4/1994 | Takahata | 379/142 |
| 5,434,797 A | | 7/1995 | Barris | 364/514 |
| 5,452,289 A | | 9/1995 | Sharma et al. | |
| 5,471,470 A | | 11/1995 | Sharma et al. | |
| 5,533,115 A | | 7/1996 | Hollenbach | 379/220 |
| 5,600,649 A | | 2/1997 | Sharma et al. | 370/435 |
| 5,608,786 A | * | 3/1997 | Gordon | 379/100 |
| 5,636,216 A | | 6/1997 | Fox et al. | 370/402 |
| 5,726,984 A | * | 3/1998 | Kubler et al. | 370/349 |
| 5,764,627 A | | 6/1998 | Sharma et al. | 370/271 |
| 5,867,495 A | * | 2/1999 | Elliott et al. | 370/352 |
| 6,009,469 A | * | 12/1999 | Mattaway et al. | 709/227 |
| 6,001,794 A | * | 1/2000 | Mordowitz et al. | 370/389 |
| 6,064,653 A | * | 5/2000 | Farris | 370/237 |

FOREIGN PATENT DOCUMENTS

| | | |
|---|---|---|
| EP | 0 781 016 A2 | 6/1997 |
| WO | WO 96/38018 | 11/1996 |
| WO | WO 97/35416 | 9/1997 |
| WO | WO 98/11704 | 3/1998 |
| WO | WO 98/30008 | 7/1998 |
| WO | WO 98/35481 | 8/1998 |
| WO | WO 99/09732 | 2/1999 |

OTHER PUBLICATIONS

Davis, J. "The Net", C/NET, Jul. 3, 1996 www.new.com.
"Business & Technology" U.S. News on line, Apr. 15, 1996, www.usnews.com.

* cited by examiner

Primary Examiner—Ajit Patel (57) ABSTRACT

The present invention includes a method or Internet phone for automatically dialing up a phone call connection across an Internet connection. Initially the caller manually dials a recipient's telephone number, and once the telephone call connection is made, the caller party's Internet phone automatically starts a dialing routine which notifies the recipient party's Internet phone that a phone call connection over an Internet connection is desired. The dialing may be a differential ringing sequence or a single ringing interval. Upon the dialing routine being detected by the recipient party's Internet phone, the parties end the telephone connection and proceed to make separate connections to the Internet, including a connection to a Lightweight Directory Access Protocol (LDAP). The caller party and recipient party Internet phones submit their respective Internet protocol address and telephone numbers. The caller party additionally submits the recipient Internet phone's telephone number. Then the Internet connection for the intended phone call is automatically completed.

31 Claims, 4 Drawing Sheets

METHOD AND APPARATUS FOR MAKING A PHONE CALL CONNECTION OVER AN INTERNET CONNECTION

FIELD OF THE INVENTION

This invention relates to phone communications and more particularly to a method apparatus for automatically setting up a phone call connection over an Internet connection.

BACKGROUND OF THE INVENTION

Typically, voice communication over the Internet works by using the combination of networks that make up a user Internet connection rather than the telecommunications network provided by a local or long distance company. Instead of talking into a telephone, a user speaks into a personal computer (PC) equipped with a microphone, speaker and a sound card. On the Internet, the voice traffic is treated as just a particular kind of data. The voice traffic, converted into bit form, is transmitted as data packets under the existing Internet protocol suites, TCP/IP (Transmission Control Protocol/IP), that facilitate the reliable exchange of data between computers over the Internet. The TCP program layer divides the voice-based data file into one or more packets, numbers the packets, and then forwards the packets to the IP program layer. The IP program layer handles the addressing of each data packet that is transmitted from one computer to another on the Internet. Essentially, the TCP/IP protocol suites manage the assembly and reassembly of data into data packets that are transmitted and received across the Internet.

Typical connection procedures across an Internet require configuration of computer hardware with a software routine which allows connection with an Internet service provider, and another software routine which accesses a server configured computer across the Internet via established protocols. These Internet connection procedures, which have evolved with computer to computer communications in mind, lack the automated phone call connection procedures available with a telephone call connection. To make a telephone call connection, a caller simply dials a telephone number of a recipient.

Accordingly, there is a need to provide a method and apparatus for automatically establishing a phone call over an Internet connection.

SUMMARY OF THE INVENTION

The present invention provides a method for automatically establishing a phone call over an Internet connection. The method includes using a dialing routine with a telephone call connection to notify of an intended phone call over an Internet connection by caller party communication equipment to recipient party communication equipment in response to a manual dialing of the telephone call connection at the caller party communication equipment. Then each of the caller and recipient party communication equipment automatically undertake to make an Internet connection and then a connection to a directory service on the Internet. The caller party communication equipment automatically provides its Internet protocol address and telephone number, and the recipient party communication equipment's telephone number. The recipient party communication equipment automatically provides its Internet protocol address and telephone number. Then the caller and recipient party communication equipment automatically complete the Internet connection between themselves for the intended phone call.

In an alternative aspect of the present invention, there is provided a method for automatically establishing a phone call over an Internet connection, wherein a caller party automatically dials a telephone number of a recipient party to establish a telephone phone call connection. The caller party automatically initiates a dialing routine to notify the recipient party of an intended phone call connection across an Internet connection. The caller and recipient parties automatically end the telephone call connection in response to the recipient party detecting the dialing routine by the caller party. The caller and recipient parties each automatically undertake to make a separate connection with an Internet service provider and then make a connection to a directory service on the Internet. Each of the caller and recipient parties automatically provide their respective Internet protocol address and telephone number, and the caller party submits the recipient party's telephone number. Each of the caller and recipient party automatically complete the Internet connection for the intended phone call connection.

In a yet further aspect of the present invention, there is provided an Internet phone. The Internet phone includes memory means for storing executable programs including operating routines, Internet related protocols, a dialing routine for selective automatic call dialing and call detection across a telephone call connection to notify of an intended phone call over an Internet connection, and a connection routine for automatically establishing the Internet connection for the intended phone call between a selectively intended caller and recipient of the intended phone call. The connection routine is responsive to the dialing routine, and the dialing routine is responsive to a manual dialing of the telephone call connection. A processor means is coupled to the memory means for downloading and processing the executable programs. A display means is coupled to the processor means for indicating when the Internet connection is established. A relay means, for selectively switching between an audio device and a telephone switching network, is responsive to the processor means. An audio interface means is coupled between the relay means and the processor means for selectively converting an audio signal from an audio device into a digital signal for the processor means and converting a digital signal from the processor means into an audio signal for the audio device. The audio interface means is responsive to the processor means. A telephone network interface means is coupled between the processor means and the relay means for selectively converting a digital signal from the processor means into an analog signal for transmission across the telephone switching network, and converting an analog signal received from across the telephone switching network into a digital signal for the processor means. The telephone network interface means is responsive to the processor means.

BRIEF DESCRIPTION OF THE DRAWINGS

Preferred features of the present invention can be best understood by reference to the description in conjunction with the following drawing figures, with like reference numerals indicating like components or steps, in which.

DETAILED DESCRIPTION OF PREFERRED EMBODIMENTS

Figure 1:
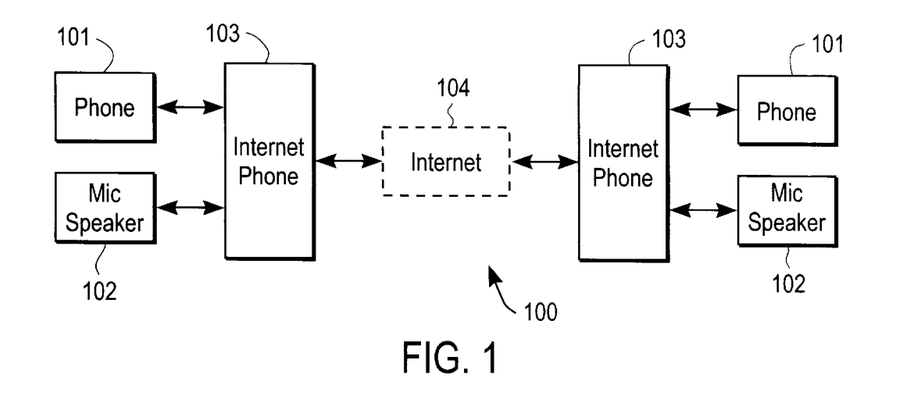
FIG. 1 is a block diagram of an Internet based phone system configuration in accordance with the present invention.

Referring to FIG. 1 there is shown a block diagram of an Internet phone system configuration in accordance with the present invention. One caller or recipient party communication equipment end consists of an Internet phone 103 connected to an external phone 101 or a microphone-speaker set 102 (i.e. audio device). The other recipient or caller party communication equipment end includes an identical Internet phone 103 connected to an external phone 101 or microphone-speaker set 102. The caller and recipient party communication equipment ends communicate over an Internet connection 104. A caller party Internet phone 103 processes voice deliveries from the phone 101 or microphone-speaker set 102 into a data packet format suitable for transmission over the Internet 104. The recipient party Internet phone 103 processes the incoming data packet format into audio signals reproducible as voice through the phone 101 or microphone-speaker set 102. Full duplex communications are achieved by each Internet phone 103 transmitting and receiving over the Internet 104 as well as converting voice to data packets or data packets to voice.

The Internet 104, over which the Internet phones 103 transmit and receive, refers to a collection of networks and gateways interconnecting dissimilar networks that transfer information under the TCP/IP (Transmission Control Protocol/Internet Protocol) suite of protocols. The TCP/IP is a two layer program that each Internet user uses to transmit or receive over the Internet 104. The TCP (Transmission Control Protocol) manages the packaging of data into packets that get routed on different paths across the Internet and reassembled at their destination. The IP (Internet Protocol) handles the address part of each data packet so that it is routed to the right destination.

Although the TCP and IP protocols are the most important, TCP/IP is really a suite of protocols including SLIP (Serial Line Internet Protocol) and PPP (Point-to-Point Protocol). SLIP is used for communications between two machines that were previously configured for communication with each other. For example, an Internet Service Provider (ISP) may provide a user with a SLIP connection so that one ISP's server can respond to the user's requests, pass them on to the Internet, and forward the user's requested Internet responses back to the user. A PPP connection with an ISP is like the SLIP connection. However, PPP is usually preferred over SLIP because PPP can handle synchronous as well as asynchronous communication. PPP can share a line with other users and has error detection which SLIP lacks.

Figure 2:
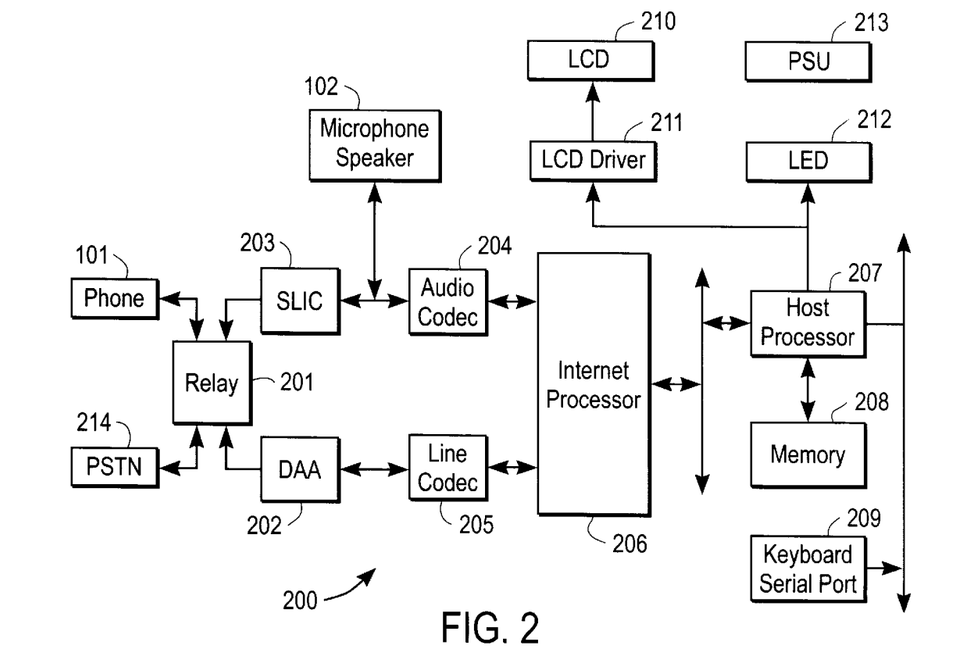
FIG. 2 is a block diagram detailing an Internet phone set-top box shown in FIG. 1.

Referring now to FIG. 2 there is shown a block diagram 200 detailing the Internet phone 103 discussed with respect to FIG. 1. The external phone 101 is connected to a relay 201 which is operable in a normal mode and an Internet mode. In the normal mode, the external phone 101 becomes connected to the Public Switched Telephone Network (PSTN) 214 and allows the user to make or receive local or long distance calls directly through the PSTN. In the Internet mode, the external phone 101 or microphone-speaker set 102 is connected to a SLIC (Subscriber Loop Interface Circuitry) and used as an audio headset.

Coupled between the relay 201 and an Internet processor 206, is an audio interface circuitry which includes the SLIC (Subscriber Loop Interface Circuitry) 203 and an audio range multiplexer and coder-decoder (Audio Codec) 204. The audio interface circuitry converts an audio signal from the phone 101 or microphone-speaker set 102 (i.e., audio device) into a digital format suitable to be processed by the Internet processor. Also, the audio interface circuitry converts a audio digital signal from the processor into an audio signal that is reproducible through the phone 101 (or microphone-speaker set 102) as voice.

The SLIC 203 is an integrated circuit, widely used as an interface in the telephone switching networks, that provides what is known as the BORSCHT functions in telephony (Battery Feed, Over-voltage Protection, Ringing, Signaling Coding, Hybrid and Test). The SLIC 203 converts 2-wire circuit analog audio signals received from the audio device (i.e. phone 101 into 4-wire circuit analog audio signals. The SLIC 203 also converts received 4-wire circuit analog audio signals back into 2-wire circuit analog audio signals which are sent to the phone 101. Because phones 101 send and receive on a 2-wire pair and the audio decoder-encoder 204 sends and receives between each other on 4-wire circuits, the SLIC 203 includes a so called "hybrid" network. This hybrid network converts the 2-wire audio into separate send and receive paths in a 4-wire line. The audio multiplexer 204 converts the 4signal from the SLIC 203 or microphone-speaker set 102 into a signal which is encoded by the Codec 204. The Codec 204 preferably uses a pulse code modulation (PCM) technique, which is a method of modulation in which signals are sampled and converted to digital words that are then transmitted serially. Most PCM systems use either 7- or 8-bit binary codes. There are, however, several standards for PCM coding: most common are $\mu$-Law in North America and A-Law in Europe (both based on logarithmic conversion of the signal). Also, the Codec and audio multiplexer 204 decode and de-multiplex, respectively, signals coming from the Internet processor 206, to provide a digital analog signal suitable for the SLIC 203 to process and send to the phone 101 or microphone-speaker set 102. Further configuration and function details of the SLIC 203 and Audio/Codec 204 are well known to those of ordinary skill in the art and need not be discussed in greater detail herein.

Also coupled between the relay 201 and the Internet processor 206 is telephone network interface circuitry, which converts the digital audio from the Internet processor 206 into an analog format suitable for transmission across the PSTN 214. The telephone network interface circuitry also converts an analog signal received from across the PSTN 214 into a digital format suitable for the Internet processor 206. The telephone network interface circuitry includes a DAA (Data Access Arrangement) 202 and a Line Codec (Coder-Decoder) 205. The DAA 202 is a universal 2 to 4 wire hybrid circuitry interface to the PSTN 214 that provides device surge protection, line impedance matching, call process detection and 2-wire to 4-wire hybrid conversion. The Line Codec 204 is a high performance 16 bit linear audio range, analog-to-digital and digital-to-analog converter (ADC and DAC). Further configuration and function details of the DAA 202 and Line Codec 205 are well known to those of ordinary skill in the art and need not be discussed in greater detail herein.

The Internet processor 206 is a high performance Digital Signal Processing (DSP) chip operable to process executable programs such as modem (Modulation-Demodulation) algorithms including V.80 and V.34+, speech related algorithms including G.723.1 and G.729, and acoustic echo cancellation algorithms.

Modem algorithms enable communications over a standard telephone network line in the PSTN by converting digital signals to analog and vice versa. Modem standards are set by the International Telecommunication Union (ITU) and assure compatibility between users transmitting and users receiving, and vice versa. The V.34+ standard is an ITU recommended standard for transmission rates up to 33,600 baud. The V.80 standard is an ITU recommended standard, which provides for in-band signaling and synchronous data modes that enable users to exchange not only voice and data, but also video, over a single analog phone line. The three main functions of a modem under the V.80 standard are: synchronous data stream run on asynchronous modem connections, rate adjustments based on line conditions, communications of lost data packets to help keep real time audio and video flowing to both sides of a communication loop.

Speech related algorithms provide speech coding and decoding to facilitate transmissions over the analog based telephone lines of the PSTN. The speech algorithm standard G.7231, an ITU recommended standard, is a dual rate speech coder for multi-media communications transmitting at 5.3 and 6.3 kilobits per second. The ITU recommended G.729 standard is a speech coding and decoding standard that provides 4 kHz speech band width at a bit rate of 8 Kilobits per second. The standard specifies a Code Excited Linear Predictive (CELP) coder that uses an algebraic code-book to code the excitation signal. The codes operate on speech frames of 10 sec (80 samples at an 8 kHz sample rate), completes the long-term predictor coefficients, and operates in an analysis-by-synthesis loop to find the excitation vector that minimizes the perceptually weighted error signal.

The Internet Processor 206 is bidirectionally coupled to a host processor 207 with on-board memory 208. The on-board memory is preferably EEPROM (Electrically Erasable Programmable Read Only Memory), but other non-volatile memory types may be used. On top of the operating system, the targeted executable routines or programs for the host processor 207 are the Internet related functions such as TCP, IP, PPP, etc. Upon the Internet phone 103 being powered on, the host processor 207 downloads, from memory 208, all the necessary host processor executable routines to its instruction and data memory space. The host processor 207 also downloads and transfers the Internet processor's 206 executable routines from the memory 208 to the Internet processor's 206 on-chip instruction and data memory space. After the system executes diagnostic and initialization routines, the Internet phone 103 is operator ready. It is to be noted that different processor and memory configurations are possible for carrying out the above detailed functions. For example a single processor with parallel processing capabilities can be used to process all the executable programs and routines processed by the Internet processor 206 and host processor 207.

The host processor 207 drives an LCD 210 (Liquid Crystal Display) which is an ASCII character display. The LCD 210 displays the mode of operations, (normal or Internet), call ID status of the call progress, and other information pertaining to the operations of the Internet phone 103. The host processor also drives a total of six (6) LED (Liquid Emitting Diode) indicators: power Internet On-Line, call progress, transmit audio, receive audio, and system diagnostic check. The power indicator, when lit, notifies if the power supply unit 213 in the Internet phone 103 has been activated. The Internet On-Line indicates if the Internet phone 103 is connected to the Internet 104. Call progress indicates if calling procedures are being undertaken. Transmit audio, when blinking, indicates that the Internet phone 103 is transmitting audio to a remote Internet phone 103. Receive audio, when blinking, indicates that the Internet phone 103 is receiving audio from a remote Internet phone 103. When the system diagnostic check is lit, the Internet phones 103 internal diagnostic routines have determined that the Internet phone 103 is in good condition and operable.

The Internet phone 103 is provided with a power on-off switch, an Internet call/auto-answer switch, a call toggle switch, a serial port 209, and a general interface port. The Internet call/auto-answer switch provides two functions: as a caller device, the switch indicates the in-coming phone call is through the Internet 104, and as a receiver, the switch indicates that the Internet phone 103 will be automatically connected to the Internet 104 if an Internet routed phone call is detected. The call toggle switch supports call waiting services and allows the user to toggle audio conversations with two parties. The general interface port is an 3/16 slot bus interface which allows for future enhancement. The power switch activates the power supply unit 213, preferably a 12 Volt DC, 1 Amp unit.

The above discussed hardware and software configuration of the Internet phone 103 also includes a link control protocol routine (i.e., program) that provides for four modes of operation as follows:

| Mode | Power On | Internet Call/ Auto-Answer | Analog Call | Internet Call |
|---|---|---|---|---|
| 1 | Off | Don't Care | Yes | No |
| 2 | On | Off | Yes | Yes {Both parties need to be manually connected to Internet} |
| 3 | On | On | Yes | Yes {Both parties will be automatically connected to Internet} |
| 4 | On | On | Yes | Yes {Both parties will be automatically connected to Internet} |

In mode 1 the Internet phone 103 is in a sleeping mode in that it is by-passed from the Internet 104 and directly connected to the PSTN. In mode 1, all incoming or outgoing analog calls are directly connected to the PSTN.

Figure 3:
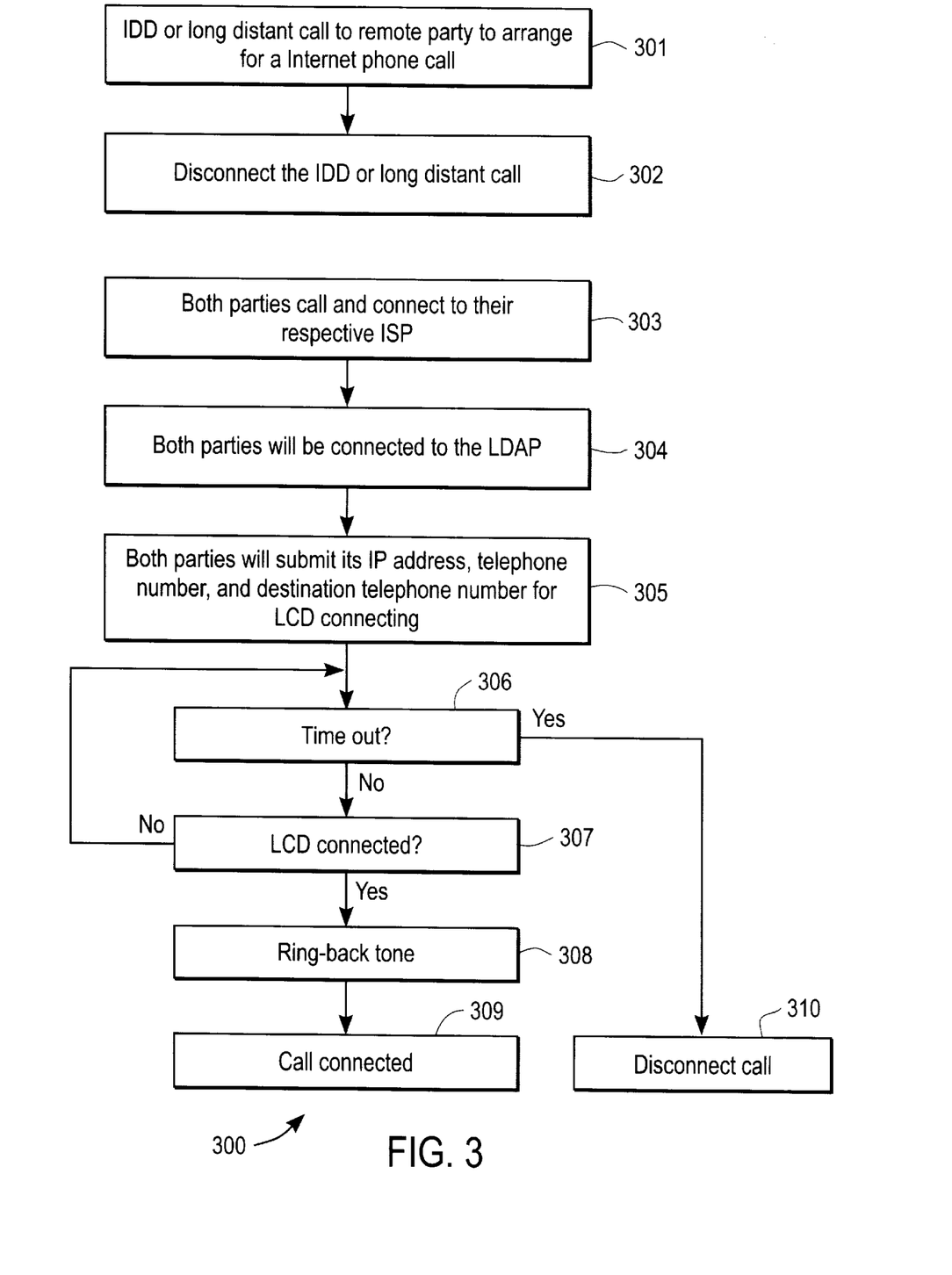
FIG. 3 is a flow chart of a manual Internet phone call setup for the Internet phone set-up box shown in FIG. 2.

In mode 2, both Internet phones 103 need to be manually connected to the Internet 104. The manual Internet phone call set up and tear down procedure is detailed by the flow chart 300 shown in FIG. 3. In mode 2, two phone calls are required to setup the connection over the Internet 104. Initially, the calling party manually calls the recipient party by an International Direct Dial (IDD) call service or long distance call service to verbally indicate that an Internet phone call is required 301. Upon agreement by the caller and recipient of an intended phone call over an Internet connection, the IDD or long distance call is disconnected 302. Both caller and recipient parties each activate the Internet Call/Auto Answer button and their respective Internet phones 103 automatically undertake to make an Internet connection, i.e. make a connection with their respective Internet Service Providers 303. Once connected to their ISPs, the caller and recipient Internet phones 103 each automatically connect to a Directory Service such as Lightweight Directory Access Protocol (LDAP) 304. The LDAP is an open standard protocol for directory services on the Internet 104. The LDAP provides a standard way for Internet clients or applications and servers to access directory services and locate organizations, organizational units or individuals. Once connected to the Directory Service such as the LDAP, each of the caller and recipient Internet phones 103 automatically submit their IP address and telephone number, and the caller Internet phone 103 also submits the recipient Internet phone's telephone number. These connection procedures are indicated by the LCD display 305. Once the LCD connection is indicated as done 307, there will be a ring back tone to the Internet phones 103 of the caller and recipient parties 308 to indicate that the Internet connection for the intended phone call is established 309. If the LCD connection is not completed in a pre-programmed time interval 306, i.e., no ring back tone is received 308 by both the caller and recipient Internet phones 103 in W seconds, the caller and recipient Internet phones 103 disconnect from their respective ISP 310. Once established, the phone call over the Internet connection can be readily disconnected by de-activating the Internet Call/Auto-Answer button.

In mode 3, both Internet phones 103 are automatically connected over an Internet 104. The automatic Internet phone call setup and tear down procedure is detailed by flow chart 400 of FIG. 4. Initially, the calling party manually dials the IDD or long distance phone number 401 of the recipient party's Internet phone 103. With a reception of the manually dialed IDD or long distance telephone number, the caller's Internet phone 103 searches its phone book directory for a match with the manually dialed telephone number 402. When no match is made with the phone book directory listings, the caller's Internet phone 103 initiates an automatic dialing routine to notify the recipient party of an intended phone call over an Internet connection. The dialing routine for a non-match with the phone book directory listing is a differential automatic dial sequence as follows: First the caller's Internet phone 103 automatically calls the manually dialed IDD or long distance telephone number of the recipient party and provides a unique ringing sequence, while the recipient's Internet phone 103 correspondingly undertakes detection of the unique ringing sequence, then the call is disconnected The prior steps of calling and detecting the unique ringing sequence and then disconnecting the call are repeated an N number of times 416, 417.

Figure 4:
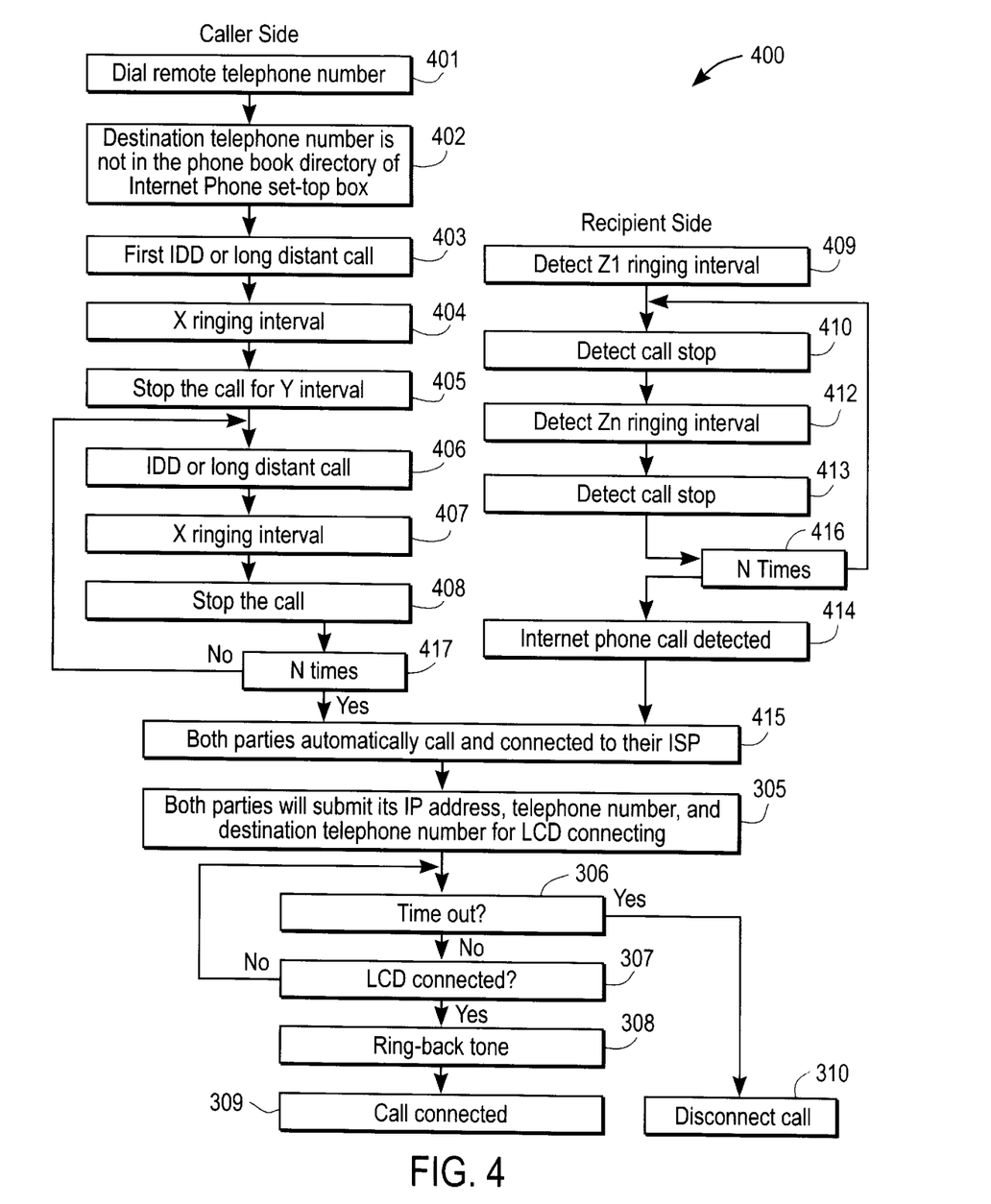
FIG. 4 is a flow chart of an automatic Internet phone call setup by a differential automatic dial sequence in accordance with the present invention.

Tables 1 and 2 below show a few possible configurations of a differential automatic dialing and detection sequence as the unique ringing sequence.

TABLE 1

Caller Party Automatic Dialing and Detection Sequence

| Caller Party | | | | |
|---|---|---|---|---|
| Detect 1st Ringing Interval | 2 | 3 | 4 | 5 |
| Disconnect Call Interval {Second} | 1–10 | 1–10 | 1–10 | 1–10 |
| Detect 2nd Call Ringing Interval | 2 | 3 | 4 | 5 |
| Disconnect Call Interval {Second} | 1–10 | 1–10 | 1–10 | 1–10 |
| xxxxxx Differential Ringing | 0 | 0 | 0 | 0 |

TABLE 2

Recipient Party Detections Sequence

| Recipient Party | | | | | | | | | | | | |
|---|---|---|---|---|---|---|---|---|---|---|---|---|
| Detect 1st Call Ringing Interval Disconnect Call Interval {Second} | 2 | 2 | 2 | 3 | 3 | 3 | 4 | 4 | 4 | 5 | 5 | 5 |

TABLE 2-continued

Recipient Party Detections Sequence

| Detect 2nd Call Ringing Interval Disconnect Call Interval {Second} | 1 | 2 | 3 | 2 | 3 | 2 | 3 | 4 | 5 | 4 | 5 | 6 |
|---|---|---|---|---|---|---|---|---|---|---|---|---|
| XXXXXXX Differential Ringing | 1 | 0 | 1 | 1 | 0 | 1 | 1 | 0 | 1 | 1 | 0 | 1 |

After the caller's Internet phone 103 has executed the automatic dialing routine, (i.e., differential automatic dialing sequence) and the recipient's Internet phone 103 has detected the automatic dialing routine, the Internet phones 103 will then automatically undertake to make an Internet connection. It should be noted that the detection of the differential dial sequence by the recipient side Internet phone 103 needs to be done in a pre-program time interval, for example, 15 to 120 seconds.

More specifically, referring to FIG. 4, the caller party manually dials the recipient's telephone number 401. The caller's Internet phone 103 detects the manually dialed telephone number and checks it against an internally stored phone book directory listing 402. If there is no match with the phone book directory listing, the caller's Internet phone 103 automatically initiates, in response to the manual dialing by the caller, an automatic dialing routine that begins with an IDD or long distance call 403 to the recipient's Internet phone 103 with a predetermined X ringing interval 404. The recipient's Internet phone 103 correspondingly undertakes detection of a predetermined Z1 ringing interval 409. The caller's Internet phone 103 stops the call 403 for a predetermined Y interval 405, while the recipient's Internet phone 103 stops detection of the call 410. The caller's Internet phone 103 then repeats making the IDD or long distance call an N number of times 406 with a predetermined X ringing interval 407 during each N number call, while the recipient's Internet phone 103 undertakes detection of a predetermined Zn ringing interval 412 during each N number call. Then the caller's Internet phone 103 stops placing the long distance call 408 and the recipient's Internet phone 103 stops detection of the call 413. The recipient's Internet phone then 103 detects that a phone call over an Internet connection is desired 414 by the caller. The caller and recipient Internet phones 103 automatically call and undertake to make an Internet connection, i.e., become connected to their respective ISPs 415. Once connected to their respective ISPs, the caller and recipient Internet phones 103 automatically connect to the Directory Service such as LDAP, the caller and recipient Internet phones 103 each submit their respective IP address and telephone number, and the caller additionally submits the recipient's telephone number 305. When the LCD displays an Internet connection 307, there will be a ring back tone to both parties 308 to indicate that the Internet call is established 309. If the LCD displayed connection is not done in a pre-programmed time interval 306, i.e., no ring back tone is received 308 by both the caller and recipient Internet phones 103 in W seconds, each of the caller and recipient Internet phones 103 disconnect from their respective ISP 310. Once established, the phone call over the Internet connection can be readily disconnected by de-activating the Internet Call/Auto-Answer button.

In mode 4, both parties are automatically connected to the Internet 104. The automatic Internet phone call setup and tear down procedure is detailed by flow chart 500 of FIG. 5. Initially, the calling party manually dials the IDD or long distance telephone number 501. With reception of the IDD or long distance telephone number, the phone 103 undertakes a match of the IDD or long distance number with a phone book directory 502.

Figure 5:
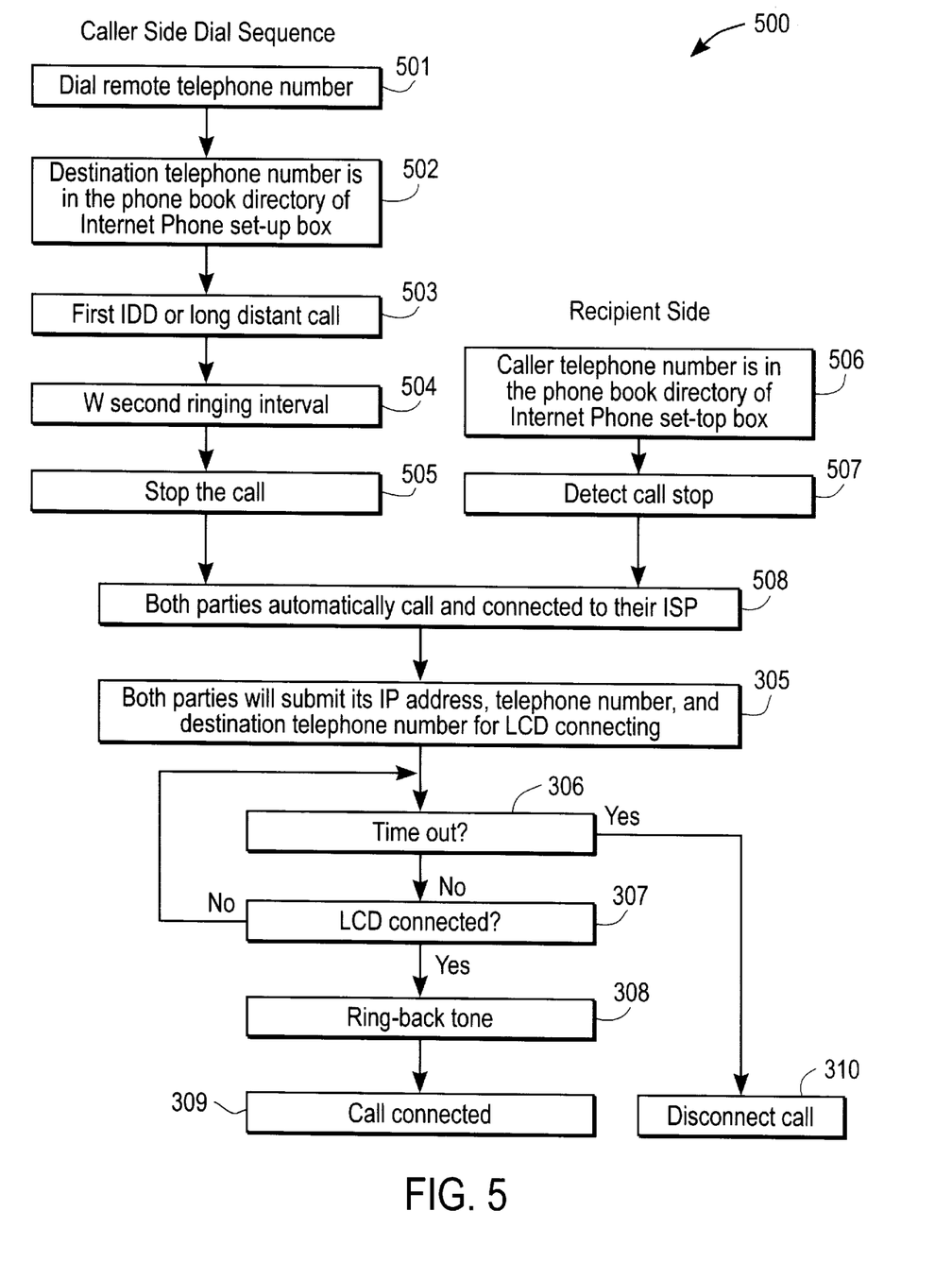
FIG. 5 in a flow chart of an automatic Internet phone call setup by a phone book directory in accordance with the present invention.

With a match to a listing in the phone book directory, the caller's Internet phone 103 initiates an automatic dialing routine that includes one IDD or long distance call 503 to the recipient's Internet phone 103 with a W second ringing interval 504, e.g., 1–60 seconds, and then the caller's Internet phone 103 stops the call 505. Correspondingly, the recipient's Internet phone 103, has the caller's telephone number in its phone book directory and, undertakes a detection of the dialing routine 506 and then stops the detection 507. Then the calling and recipient Internet phones 103 automatically undertake to make an Internet connection, i.e., call and be connected to their respective ISPs 508, and then connect to the Directory Service such as. Once connected to the LDAP, each of the caller and recipient Internet phones 103 submit their respective IP address and telephone number. The caller Internet phone also submits the recipient's telephone number. When the LCD displays an Internet connection 307, there will be a ring back tone to both parties 308 to indicate that the Internet call is established 309. If the LCD displayed connection is not done in a pre-programmed time interval 306, i.e., no ring back tone is received 308 by both the caller and recipient Internet phones 103 in W seconds, each of the caller and recipient Internet phones 103 disconnect from their respective ISP 310. Once established, the phone call over the Internet connection can be readily disconnected by de-activating the Internet Call/Auto-Answer button.

It can be appreciated that the above hardware and software configuration can be practiced to provide teleconference capabilities between multiple phone parties. The tele-conference can be with all parties interconnected through an Internet connection and an Internet phone and the above software and hardware configurations modified to provide for full duplex communications between all the parties. Alternatively, two parties can be connected over the Internet as described above, and multiple parties can be brought into the phone call connection through connections over the PSTN into the phones 101. In this case the relay would be in an additional mode whereby the phone 101 is in both a PSTN mode and an Internet mode.

The disclosures of the following U.S. patents are incorporated herein by reference to the extent necessary or desirable to explain the invention: Barris U.S. Pat. No. 5,434,797 granted Jul. 18, 1995; Hollenback, et al. U.S. Pat. No. 5,533,155 granted Jul. 2, 1996; and Fox, et al. U.S. Pat. No. 5,636,216 granted Jun. 3, 1997.

Variations, combinations and permutations of the above as would occur to those of ordinary skill in the art are included in the scope and spirit of the invention. For example, the above described Internet phone 103 can be utilized with a facsimile input device, in lieu of or in combination with the external phone 101 or microphone-speaker set 102, in conjunction with the automatic dialing and call setups based on the differential ringing sequence of mode 3, or the single ringing interval of mode 4. Also, the above described programs, automatic dialing routines and hardware functions can be configured into a personal computer system that executes the automatic dialing routine to automatically setup a phone call over an Internet connection.

What is claimed is:

1. A method for automatically establishing a phone call between a caller party communication equipment and a recipient party communication equipment over an Internet connection via a directory service on the Internet, said method comprising the steps of:

at the caller party communication equipment, dialing a destination telephone number of the recipient party communication equipment using a dialing routine; said dialing routine initiating a unique ringing sequence to notify the recipient party communication equipment that the caller party communication equipment desires to establish an Internet connection with the recipient party communication equipment;

in response to receiving a signal that the recipient party communication equipment is available for the Internet connection, establishing an Internet connection between the caller party communication equipment and an Internet service provider;

receiving from the Internet service provider an Internet protocol address;

providing automatically to the directory service on the Internet the caller party communication equipment's Internet protocol address and telephone number, and said recipient party communication equipment's telephone number;

in response to the directory service receiving the recipient party communication equipment's Internet protocol address and telephone number, determining at the directory service a match between the recipient party communication equipment's telephone number provided by the caller party communication equipment and the recipient party communication equipment's telephone number provided by the recipient;

providing to the caller party communication equipment the Internet protocol address of the recipient party communication equipment to allow sending and receiving data via the Internet connection.

2. The method according to claim 1, wherein said dialing routine comprises automatically dialing and completing a telephone call connection to said recipient party communication equipment with selectively one of a differential ringing sequence and a single ringing interval, each of said differential ringing sequence and said single ringing interval being detectable by said recipient party communication equipment.

3. The method according to claim 2, wherein said differential ringing sequence comprises providing a predetermined ringing and then disconnecting said telephone connection to said recipient party communication equipment for a predetermined interval, and then repeating automatically for a given number of times another telephone connection to said recipient party communication equipment followed by said predetermined ringing interval and then disconnecting said another telephone connection.

4. The method according to claim 2, wherein said single ringing interval is utilized by said dialing routine when said telephone number of said recipient party communication equipment is known to said caller party communication equipment, and said telephone number of said caller party communication equipment is known to said recipient party communication equipment.

5. The method according to claim 4 wherein said telephone number is known by matching up with an entry in a phone book directory in each of said caller and recipient party communication equipment.

6. The method according to claim 1, wherein said step of undertaking said Internet connection comprises undertaking a connection with an Internet service provider and said directory service is a Lightweight Directory Access Protocol (LDAP).

7. A method for automatically establishing a phone call between a caller party communication equipment and a recipient party communication equipment over an Internet connection via a directory service, said method comprising the steps of:

dialing at the caller party communication equipment a telephone number of a recipient party communication equipment to establish a telephone phone call connection;

initiating a dialing routine to notify said recipient party communication equipment of an intended phone call connection across an Internet connection;

terminating said telephone call connection in response to said recipient party detecting said dialing routine by said caller party communication equipment;

at the caller party communication equipment, establishing a separate connection with an Internet service provider and them making a connection to a directory service on the Internet;

providing to the directory service the caller party communication equipment's Internet protocol address and telephone number and said recipient party's telephone number; and receiving, in response to the directory service receiving the recipient party communication equipment's Internet protocol address and telephone number and performing a match between the recipient party's telephone number provided by the caller party communication equipment and the recipient party's telephone number provided by the recipient party communication equipment, the Internet protocol address of the recipient party communication equipment to enable the caller party communication equipment to send data to and receive data from the recipient party communication device.

8. The method according to claim 7, wherein said dialing routine comprises automatically dialing and completing a telephone call connection to said recipient party with selectively one of a differential ringing sequence and a single ringing interval, each of said differential ringing sequence and said single ringing interval being detectable by said recipient party.

9. The method according to claim 8, wherein said differential ringing sequence comprises providing a predetermined ringing and then disconnecting said telephone connection to said recipient party communication equipment for a predetermined interval, and then repeating automatically for a given number of times another said telephone call connection to said recipient party followed by said predetermined ringing interval and then disconnecting said another telephone call connection.

10. The method according to claim 8, wherein said single ringing interval is utilized by said dialing routine when said telephone number of said recipient party is known to said caller party before said step of dialing automatically, and said telephone number of said caller party is known to said recipient party before said step of dialing automatically.

11. An Internet phone comprising:

memory means for storing a dialing routine for initiating a unique ringing sequence to notify a recipient device that a calling device desires to make a phone call over an Internet connection;

memory means for storing a dialing routine detection process for detecting a unique ringing sequence from a calling device;

processor means coupled to said memory means for downloading and processing said dialing routine and detection routine;

means coupled to said processor means for indicating when said Internet connection is established;

relay means for selectively switching between an audio device and a telephone switching network, said relay means being responsive to said processor means;

audio interface means coupled between said relay means and said processor means for selectively converting an audio signal from said audio device into a digital signal for said processor means, and converting a digital signal from said processor means into an audio signal for said audio device, said audio interface means being responsive to said processor means; and telephone network interface means coupled between said processor means and said relay means for selectively converting a digital signal from said processor means into an analog signal for transmission across said telephone switching network, and converting an analog signal received from across said telephone switching network into a digital signal for said processor means, said telephone network interface means being responsive to said processor means.

12. The Internet phone according to claim 11, wherein said operating routines comprise an operating system routine, a modem algorithm, a speech processing algorithm, and an acoustic echo cancellation algorithm.

13. The Internet phone according to claim 12, wherein said processor means comprises a host processor means coupled to said memory means for processing said operating system routine and said Internet related protocols, and an Internet processor coupled between said host processor means and each of said audio interface means and said telephone network interface means for processing said modem algorithm, speech processing algorithm, and echo cancellation algorithm.

14. The Internet phone according to claim 11, wherein said audio interface means comprises a subscriber line interface circuit (SLIC) coupled to said relay means, a coder-decoder (PCM Codec) coupled to said processor means, and an audio multiplexer coupled between said subscriber line interface circuit (SLIC) and said coder-decoder (Codec).

15. The Internet phone according to clam 11, wherein said telephone network interface means comprises a data access arrangement (DAA) coupled to said relay means, and a linear audio range analog-to-digital (AD) and digital-to-analog (DA) converter coupled between said data access arrangement (DAA) and said processor means.

16. The Internet phone according to claim 11, wherein said dialing routine comprises automatically dialing and completing a telephone connection to said Internet phone of said recipient party followed selectively by one of a differential ringing sequence and a single ringing interval, each of said differential ringing sequence and said single ringing interval being detectable by said Internet phone of said recipient party.

17. The Internet phone according to claim 16, wherein said differential ringing sequence comprises providing a predetermined ringing and then disconnecting said telephone call connection to said Internet phone of said recipient party for a predetermined interval, and then repeating for a given number of times automatically the steps of completing another said telephone call connection to said Internet phone of said recipient party with another said predetermined ringing interval and then disconnecting said another telephone call connection.

18. The Internet phone according to claim 16, wherein said memory further comprises a phone book directory of a selective potential one of said Internet phone for a caller and recipient party for said intended phone call over said Internet connection.

19. The Internet phone according to claim 11, wherein said connection routine comprises a routine for undertaking an Internet connection and making a connection to a Lightweight Directory Access Protocol (LDAP), and selectively providing said Lightweight Directory Access Protocol with an Internet Protocol address, and telephone number of said intended caller and recipient to establish said Internet connection.

20. The Internet phone according to claim 19, wherein said routine for undertaking said Internet connection comprises a routine for automatically establishing a connection with an Internet service provider.

21. The method according to claim 1, wherein said caller party communication equipment comprises at least one of a stand alone personal computer, Internet phone, and gateway.

22. The method according to claim 1, wherein said recipient party communication equipment comprises at least one of a stand alone personal computer, Internet phone, and gateway.

23. The method according to claim 3, wherein said differential ringing sequence comprises parameters based on an interval of said predetermined ringing, said predetermined stop interval, and number of times said predetermined ringing and said predetermined stop interval are repeated, said parameters for said interval of said predetermined ringing, said predetermined stop interval and said number of times being composed as a look-up table at said caller party communication equipment, said parameters being based on said geographic locations of a caller and recipient, and a transmission path.

24. The method according to claim 3, wherein an interval of said predetermined ringing can be substituted by a duration to a tone detection of a ringing tone by said recipient party communication equipment, said caller party communication equipment being usable to detect said ringing tone of said recipient party communication equipment through a tone detection of a modem of said caller party communication equipment as a dynamic way to determine said interval of said predetermined ringing.

25. The method according to 1, wherein said caller party communication equipment is configured for attempting an Internet connection with said recipient party communication equipment if a busy tone is received when said caller party communication equipment executes said notifying.

26. The method according to claim 9, wherein said differential ringing sequence comprises parameters based on an interval of said predetermined ringing, said predetermined stop interval, and number of times said predetermined ringing and said predetermined stop interval are repeated, said parameters for said predetermined ringing, said predetermined stop interval and said number of times being composed as a look-up table at said caller party communication equipment, said parameters being based on said geographic locations of a caller and recipient, and a transmission path.

27. The method according to claim 9, wherein an interval of said predetermined ringing can be substituted by a duration to a tone detection of a ringing tone by said recipient party communication equipment, said caller party communication equipment being usable to detect said ringing tone of said recipient party communication equipment through a tone detection of a modem of said caller party communication equipment as a dynamic way to determine said interval of said predetermined ringing.

28. The Internet phone according to claim 17, wherein said differential ringing sequence comprises parameters based on an interval of said predetermined ringing, said predetermined stop interval, and number of times said predetermined ringing and said predetermined stop interval are repeated, said parameters for said predetermined ringing, said predetermined stop interval and said number of times being composed as a look-up table at said caller party communication equipment, said parameters being based on said geographic locations of a caller and recipient, and a transmission path.

29. The Internet phone according to claim 17, wherein an interval of said predetermined ringing can be substituted by a duration to a tone detection of a ringing tone by said recipient party communication equipment, said caller party communication equipment being usable to detect said ringing tone of said recipient party communication equipment through a tone detection of a modem of said caller party communication equipment as a dynamic way to determine said interval of said predetermined ringing.

30. A method for establishing an Internet connection between a caller party communication equipment and a recipient party communication equipment, the method comprising the steps of:

using a dialing routine for initiating a unique ringing sequence to notify the recipient party communication equipment that the caller party communication equipment desires to establish an Internet connection with the recipient party communication equipment;

using a dialing detection signaling protocol to detect the dialing routine;

in response to receiving the caller party's Internet protocol address and the recipient party's telephone number from the caller party communication equipment, and in response to receiving the recipient party's Internet protocol address and the recipient party's telephone number from the recipient party communication equipment, matching the recipient party's telephone number provided by the caller party with the recipient party's telephone number provided by the recipient party; and providing the recipient party's Internet protocol address to the caller party communication equipment and the caller party's Internet protocol address to the recipient party communication equipment.

31. An apparatus for establishing an Internet connection between a caller party communication equipment and a recipient party communication equipment comprising:

a dialing routine device for initiating a unique ringing sequence to notify the recipient party communication equipment that the caller party communication equipment desires to establish an Internet connection with the recipient party communication equipment;

a dialing detection signaling protocol to detect the dialing routine;

a directory service for receiving from the caller party communication equipment the caller party's Internet protocol address and the recipient party's telephone number, and for receiving from the recipient party communication equipment the recipient party's Internet protocol address and the recipient party's telephone number, and for matching the recipient party's telephone number provided by the caller party and the recipient party's telephone number provided by the recipient party; the directory service then providing the recipient party's Internet protocol address to the caller party communication equipment and the caller party's Internet protocol address to the recipient party communication equipment.

* * * * *